(12) United States Patent
Roby (10) Patent No.: US 9,068,666 B2
(45) Date of Patent: Jun. 30, 2015

(54) ELECTRONIC COOLANT VALVE WITH INTEGRAL ACTUATOR MECHANISM

(75) Inventor: Joshua L. Roby, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 238 days.

(21) Appl. No.: 13/696,666

(22) PCT Filed: May 3, 2011

(86) PCT No.: PCT/US2011/034955
§ 371 (c)(1),
(2), (4) Date: Nov. 7, 2012

(87) PCT Pub. No.: WO2011/143004
PCT Pub. Date: Nov. 17, 2011

(65) Prior Publication Data
US 2013/0056660 A1    Mar. 7, 2013

Related U.S. Application Data

(60) Provisional application No. 61/333,245, filed on May 10, 2010.

(51) Int. Cl.
| | |
|---|---|
| *F16K 11/22* | (2006.01) |
| *F16K 31/04* | (2006.01) |
| *F16K 31/44* | (2006.01) |
| *F16H 1/34* | (2006.01) |
| *F16H 25/22* | (2006.01) |
| *F02M 25/07* | (2006.01) |
| *F16H 25/20* | (2006.01) |
| *H02K 7/06* | (2006.01) |
| *F01P 7/14* | (2006.01) |

(52) U.S. Cl.
CPC ............ *F16K 31/04* (2013.01); *F16H 25/2252* (2013.01); *F02M 25/0789* (2013.01); *F16H 25/2018* (2013.01); *F02M 25/0773* (2013.01); *H02K 7/06* (2013.01); *F16H 25/2266* (2013.01); *F16H 2025/228* (2013.01); *F01P 7/14* (2013.01); *F01P 2007/146* (2013.01)

(58) Field of Classification Search
CPC .......... F16H 25/2266; F16H 2025/228; F16H 25/2252; F16H 25/2018; F16H 25/2247; F16H 2001/2881; H02K 7/06; F15B 15/068; F02M 25/0773; F02M 25/0789; B23Q 5/408; B23Q 5/406; B60N 2002/023
USPC ............. 137/883, 887; 251/129.11, 215–225, 251/333; 74/424.92

See application file for complete search history.

(56) References Cited

U.S. PATENT DOCUMENTS

| | | | | |
|---|---|---|---|---|
| 2,966,072 | A | * | 12/1960 | Wise ........................... 74/424.92 |
| 3,128,792 | A | * | 4/1964 | Clinton ....................... 137/625.5 |
| 3,646,790 | A | * | 3/1972 | Properzi ............................ 72/43 |
| 3,980,002 | A | * | 9/1976 | Jarman et al. ................... 91/461 |
| 3,985,333 | A | * | 10/1976 | Paulsen ..................... 251/129.07 |
| 4,050,319 | A | * | 9/1977 | Stanley ...................... 74/424.92 |
| 4,401,009 | A | * | 8/1983 | Zeuner et al. ..................... 91/28 |

(Continued)

*Primary Examiner* — John Fox
*Assistant Examiner* — Seth W MacKay-Smith (57) ABSTRACT

An electronic coolant valve mechanism with an integral actuator mechanism. The coolant valve mechanism utilizes an electric motor and a planetary roller mechanism integrated into a valve body to translate and operate a valve member in a linear direction. A manifold can include a plurality of coolant valve mechanism operating independently by a control system.

6 Claims, 7 Drawing Sheets

(56) References Cited

U.S. PATENT DOCUMENTS

| | | | |
|---|---|---|---|
| 4,524,793 A * | 6/1985 | Silverwater | 137/198 |
| 4,582,294 A * | 4/1986 | Fargo | 251/129.15 |
| 6,250,602 B1 * | 6/2001 | Jansen | 251/129.11 |
| 6,378,839 B2 * | 4/2002 | Watanabe et al. | 251/129.11 |
| 6,603,229 B1 * | 8/2003 | Toye, IV | 310/90 |
| 7,325,780 B2 * | 2/2008 | Arai et al. | 251/65 |
| 7,358,632 B2 * | 4/2008 | Hatano et al. | 310/80 |
| 2004/0056229 A1 * | 3/2004 | Biester | 251/205 |

* cited by examiner

ELECTRONIC COOLANT VALVE WITH INTEGRAL ACTUATOR MECHANISM

TECHNICAL FIELD

The present invention relates to thermostatic valves for coolant systems.

BACKGROUND

Vehicle heat exchanges, such as radiators, have coolant valves which are used to control the rate that the coolant is allowed to flow through the system. Although there have been many changes and improvements in vehicle cooling systems over the last few decades, the wax pill actuated coolant valve (thermostat) has remained virtually unchanged since its inception. With the increase in government mandated fuel economy regulations, vehicle manufacturers are increasingly looking for new technology that will reduce the parasitic losses and improve efficiency of internal combustion engines. Furthermore, the introduction of hybrid and full electric vehicle powertrains has introduced new powertrain cooling and thermal management complexities due to the need to control the temperature of batteries, inverter electronics, eMotors, and the like. Both of these trends indicate the need of a more intelligently controlled coolant valve.

There are several key challenges in designing direct electric actuated coolant valves. First, the valve requires a relatively large flow opening, which precludes using a direct solenoid actuation system as is common in hydraulic valves. Furthermore, the coolant can often become somewhat "sludgy," which can cause the valve to stick and fail.

For these reasons, some companies have introduced a heated wax design in which a heating element is used to expand the wax to open the valve. This provides a direct electrically actuation mechanism, but does not provide for precise control. Other companies have designs which use a brushless DC motor and gear train for actuating the valve. However, most of these designs are relatively complex and difficult to package. Also another design has a controlled coolant valve that employs a rotary mechanism that is actuated by a brushless DC gearmotor.

SUMMARY OF THE INVENTION

The present invention addresses these issues with an electric motor and planetary roller mechanism integrated into a valve body. In this embodiment, a stepper motor is used to transfer rotary motion into the planetary roller mechanism. The planetary roller mechanism transfers the rotary motion into a linear motion which is used to open and close the valve seat. The emotor rotates a housing in which a plurality of roller members are positioned. The housing and roller members impart linear motion to a threaded valve shaft. This configuration provides a compact and cost effective method for manufacturing direct electrically actuated coolant valves.

An onboard CAN-based vehicle communication interface can be used to control the operation of an embodiment of the present invention. The coolant valve can also be integrated into a manifold which can be used to proportionally regulate coolant flow to any device, or any one, or all, of a vehicle's powertrain devices requiring thermal management. In this embodiment, the manifold block has an electronics backplane that enables the valves to be plugged in with a common interface from the valve block to the vehicle network. This enables controlled distribution of coolant in an array of vehicle heat exchangers.

A preferred embodiment also could include a parabolic-shaped valve member and a short valve seat to optimize linear flow of the coolant through the valve and thus optimize performance of the valve. Additional features could include a position sensing system for monitoring accurate positioning of the moveable valve member(s) and in turn accordingly monitoring the flow of coolant through the valve(s).

Other objects, features, benefits and advantages of the present application will become apparent from the following description of preferred embodiments of the invention when viewed in accordance with the accompanying drawings and appended claims.

DESCRIPTION OF THE PREFERRED EMBODIMENTS

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein particularly relate to coolant valve mechanisms used for heat exchangers, such as vehicle radiators. The valves are used in systems which circulate the coolant in an engine, such as an automobile internal combustion engine. However, the present invention can also be used for other heat exchanger and coolant systems and is not to be limited by the scope of the preferred embodiments described and illustrated herein.

In general, a preferred embodiment of the present inventive coolant valve assembly 10 includes a planetary roller mechanism 12 which is used to control the position of a valve member 14. The coolant valve is adapted to be positioned in a coolant system structure in the manner shown in FIGS. 1-3. Other uses and positions for the inventive valve assembly 10 would be known to persons of ordinary skill in the art. The valve member 14 is located in a position to mate with a corresponding valve seat 15 in the coolant system. The valve member 14 includes a head member 16 and a stem member 18.

Figure 1:
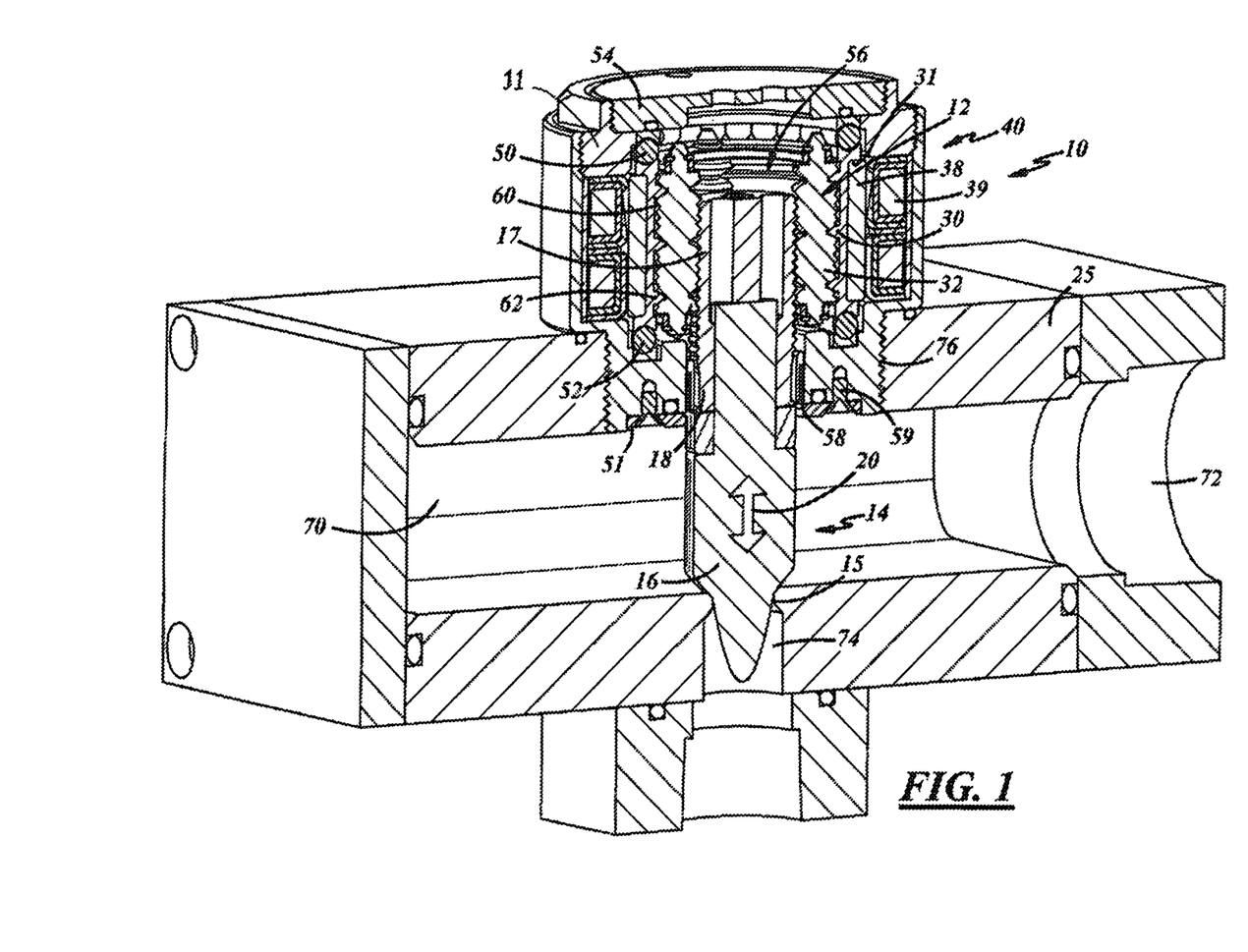
FIG. 1 is a schematic perspective illustration of an embodiment of the present invention.
Figure 2:
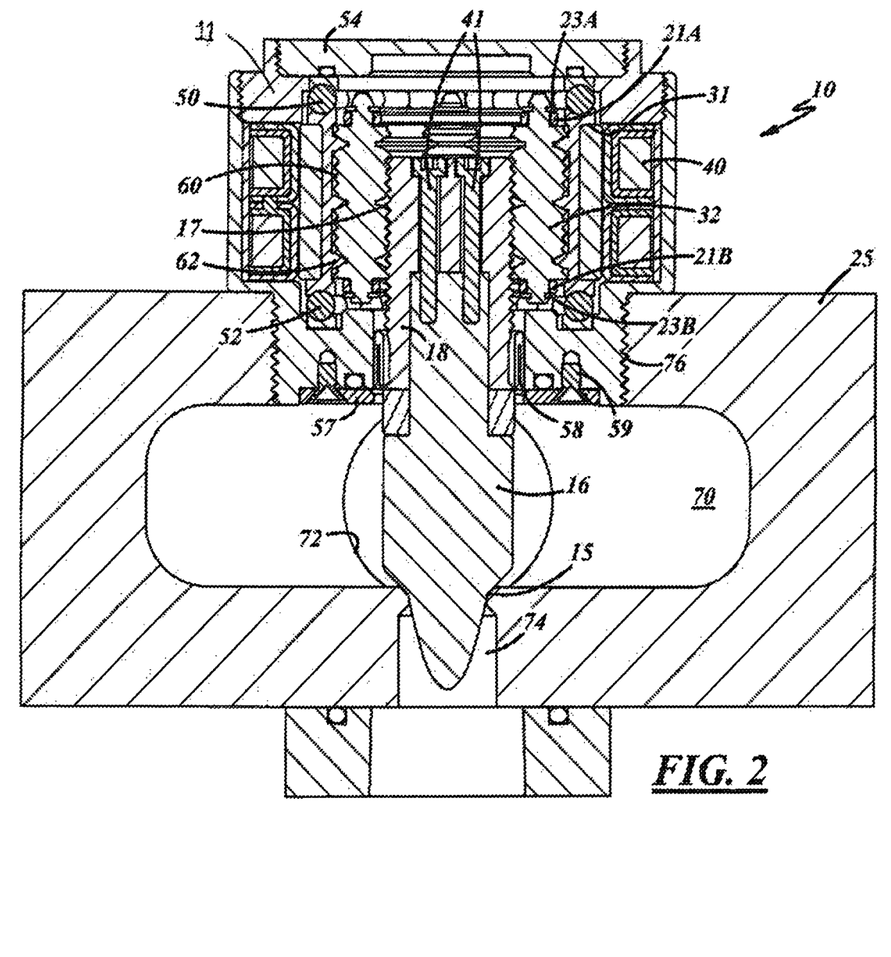
FIG. 2 is a cross-sectional view of a preferred embodiment of the invention in a closed position.
Figure 3:
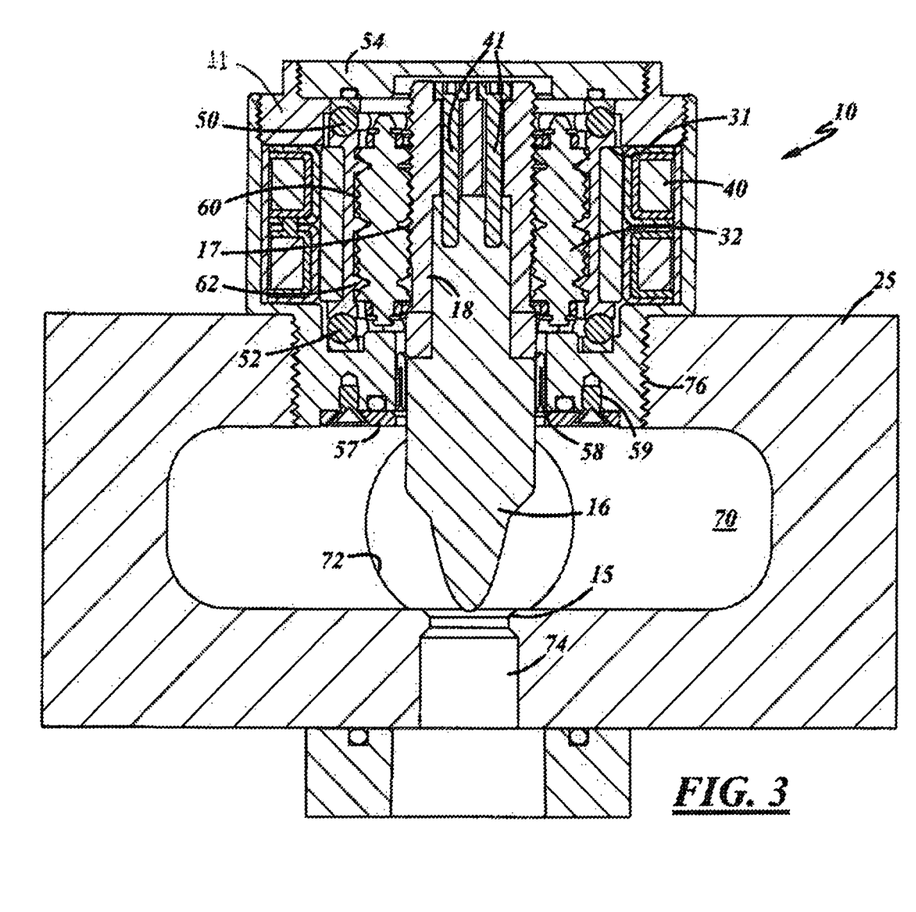
FIG. 3 is a cross-sectional view of a preferred embodiment of the invention in an open position.

The motion of the valve member 14 is shown by arrow 20. The planetary roller mechanism 12, when activated in a manner described below, moves the valve member 14 linearly in an axial manner in accordance with arrow 20. The coolant valve assembly 10 itself is used, for example, to open, close and regulate the flow of coolant into, out of, or through a coolant system, or a portion of a coolant system. As explained above, however, the present invention can be utilized with any type of heat exchanger to perform similar functions.

The preferred planetary roller mechanism 12 provides a high efficiency method of converting rotary motion from a motor to linear motion that controls the position of the valve member 14 relative to the valve seat 15. The planetary roller mechanism 12 provides rotary to a linear motion transfer without any sliding friction. The mechanism 12 also does not need to recirculate elements and it has much higher speed and load capacity than a ball screw mechanism. In addition, the roller actuator cannot be back driven, and cannot be forced into a different position by the force of the coolant flow. This also means that there is no holding torque and accompanying parasitic electric power draw required to hold the valve seat in a given position.

The roller mechanism 12 includes a cylindrical roller housing member 30 and a plurality of roller members 32 positioned inside the housing member 30. These components are better shown in FIGS. 4 and 5. The roller members 32 rotate and are held in place in the housing 11 of the valve assembly 10 by snap rings. Preferably three or four roller members 32 are provided, although the invention should not be limited to this number of roller members and any number could be utilized. For example, the number of roller members could vary depending on the size of the valve assembly and its intended use.

The roller housing 30 is securely attached to the rotor member 38 of the electric motor 40. The roller housing 30 rotates with the rotor member 38 and rotates the roller members 32. The rotor member preferably comprises a plurality of magnets which are glued or otherwise securely affixed to the outside surface of the roller housing 30. In this manner, when the electric motor 40 is actuated, the rotor member and roller housing rotate together. If desired, a groove or channel 31 could be provided on the outside surface of the housing for placement of the magnets (as shown in FIGS. 1-3).

The valve stem member 18 is threaded in order to mate with the annular grooves on the roller members 32. The rotation of the roller members 32 and the housing 30 causes the valve member 14 to translate axially in the direction of arrow 20.

The electric motor 40 is integrated into the housing 11 of the coolant valve assembly 10. The member 40 is preferably a brushless stepper DC motor and has a stator member 50 along with the rotor member 38. The stator member 39 includes a pair of electrical coil windings held in annular U-shaped housings. The rotor member 38 with its plurality of magnets is positioned radially inwardly of the stator member 39.

The planetary roller members 32 roll inside the roller housing 30 and are held in position inside the housing 30 by spacer rings 21A and 21B (see FIG. 2). The roller members 32 are held in, and attached to, the spacer rings 21A, 21B by snap rings 23A and 23B.

As indicated, the valve assembly 10 is adapted to be positioned in a coolant structure or manifold 25, as shown in FIGS. 1-3. The manifold illustrated could be a part or component of a coolant system for a vehicle or the like. The manifold illustrated has a flow chamber 70 which receives coolant from a passageway (or flow pipe) 72 and is adapted to selectively allow all, none, or a portion of the coolant to flow into exit passageway 74. A valve member with a valve seat 15 is positioned at the entrance to passageway 74.

The housing member can be attached to the coolant manifold in any conventional manner, such as by a mating threaded connection 76, as shown in FIGS. 1-3.

For illustration purposes, the valve mechanism is shown in the fully closed position in FIG. 2 and in the fully open position in FIG. 3.

Thrust bearings 50 and 52 allow the rotor member and roller housing to rotate freely relative to the stator member and housing. In the embodiment shown in FIGS. 1-3, two thrust bearings are provided.

A printed circuit board (PCB) is used to supply power to the motor in order to operate the moveable valve member. The PCB (not shown) could be positioned in any convenient place in the housing. One preferred location is in the cap member 54 which seals the internal cavity 56 in the housing member where the motor and planetary roller member are positioned.

A seal member 58 is positioned between the housing member and the moveable valve stem member to prevent coolant from entering the internal cavity in the housing. Preferably, the seal member is a rolling diaphragm seal, although other conventional sealing members, such as O-rings, could be utilized. The use of a rolling diaphragm seal also prevents any rotation of the valve member relative to the housing member.

A plate member 57 can be positioned at the end of the housing adjacent the manifold in order to retain the seal member 58 in place. A plurality of fasteners 59, such as machine screws, can be used to secure the plate member in place.

The valve member 14, which preferably is made from stainless steel, is threaded on at least a portion of its outer surface. The threads 17 mate with the annular grooves 60 on the roller members 32.

The valve member shown in FIGS. 1-3 has two components, a hollow tubular member (stem) 18 and a nose cone member (head) 16. The stem member 18 preferably is a hollow tubular member for ease of manufacture and for reduction of valve member weight. A solid stem member could also be utilized.

If the moveable valve member 14 is provided in two parts 16 and 18 as shown, the two parts can be fixedly secured together in any conventional manner. One manner could be a pair of fastener members 41 as shown in FIGS. 2 and 3.

Figure 4:
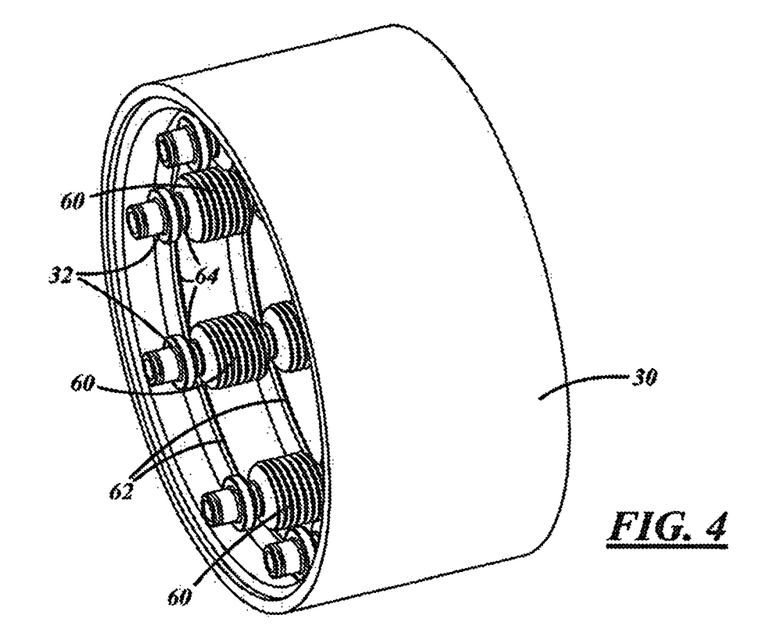
FIGS. 4 and 5 are enlarged views depicting components of a planetary roller mechanism which can be used with an embodiment of the present invention.
Figure 5:
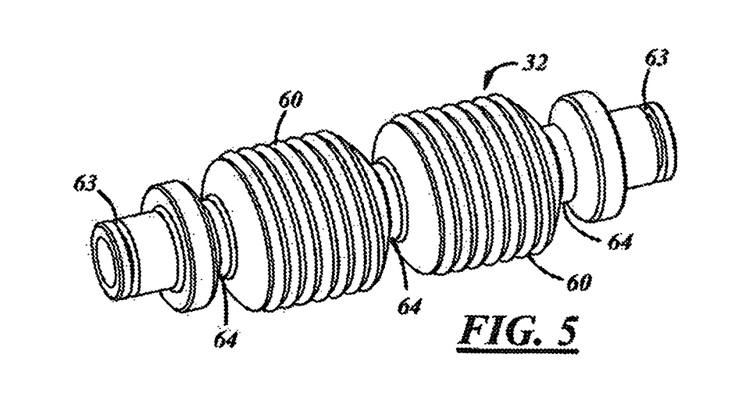

Also, as shown by FIGS. 4 and 5, the housing member 30 has a series of circular ridges 62 on its inside surface. The ridges mate with the deep grooves 64 on the roller members 32. The mating ridges and deep grooves keep the roller members and housing member in axial alignment. The roller members 32 also have annular grooves 63 adjacent their ends for placement of the snap rings 23A and 23B.

The screw thread pitch on the valve stem member is dependent on the spacing of the annular grooves on the roller members. The thread pitch on the valve stem member is the same as the groove pitch on the roller members. In order to allow the set of roller members to stay in position axially, the grooves 60 are shifted axially on each consecutive roller member in the set. The amount of the groove shifting is determined by the equation:

stem thread pitch/number of roller members. If there is more than one start for the screw-type threads on the valve stem member 18, then the amount of groove shifting is determined by the equation: (stem thread pitch×number of starts)/number of rollers.

It is also possible with the present invention to use other types of roller members. For example, roller members could have screw-type threads which mate with the screw-type threads on the stem member. The roller members could also have gear members on one or both ends and be rotated by one or more gear wheels in place of the spacer rings. The roller screws could be differential roller screws (such as those provided by August Steinmeyer GmbH), planetary roller screws from Exlar Corp. in Minnesota, or Nook Industries, "Spiracon" roller screws from Power Jacks Ltd. in Scotland, or "Satellite" roller screws from Rollvis SA in Switzerland.

Axial translation of the valve seat member 14 in a direction 20 toward the valve seat acts to force the valve member 18 toward its closed valve position. The motor 40 is a reversible motor and is used to drive the valve seat member in both directions. Thus, when it is required to open the valve or enlarge the valve opening to allow more coolant flow, the electric motor 40 is reversed, driving (rotating) the planetary roller mechanism 12 in the opposite direction.

The head (or nose cone) member 16 preferably has a parabolic shape as shown in FIGS. 1-3. This shape promotes linear flow of the coolant through the valve seat 15 and into the exit passageway 74. Linear flow of the coolant optimizes the controllability of the valve assembly.

A shortened valve seat 15, as shown in FIGS. 1-3, also assists in optimizing the flow through the valve—and also prevents the valve head from sticking in the valve seat 15.

Figure 7:
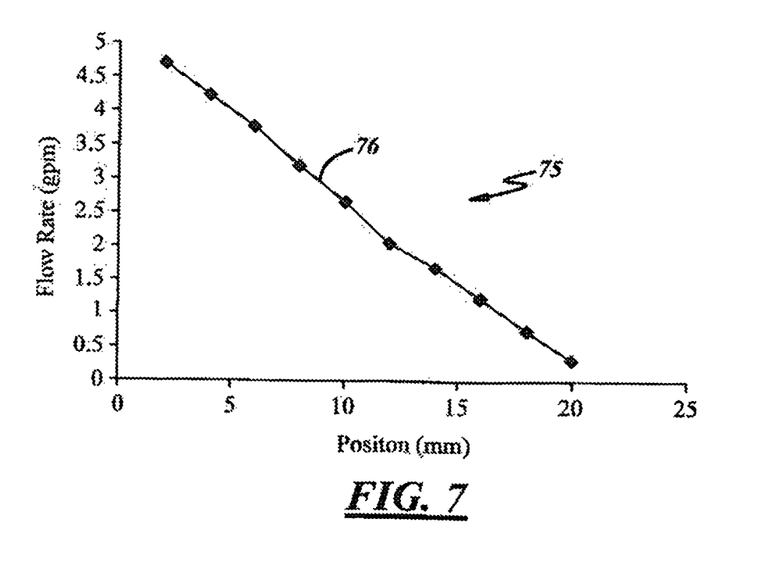
FIG. 7 is a graph illustrating the linear flow of coolant through an embodiment of the present invention.

The parabolic valve head structure together with a shortened valve seat provide a linear flow through the valve, regardless of the amount of opening of the valve. A graph showing this effect from such an embodiment is shown in FIG. 7 and identified by the reference numeral 75. The graph line 76 illustrates that the flow rate of the coolant through the valve is linear regardless of the position of the valve head relative to the valve seat.

Figure 6:
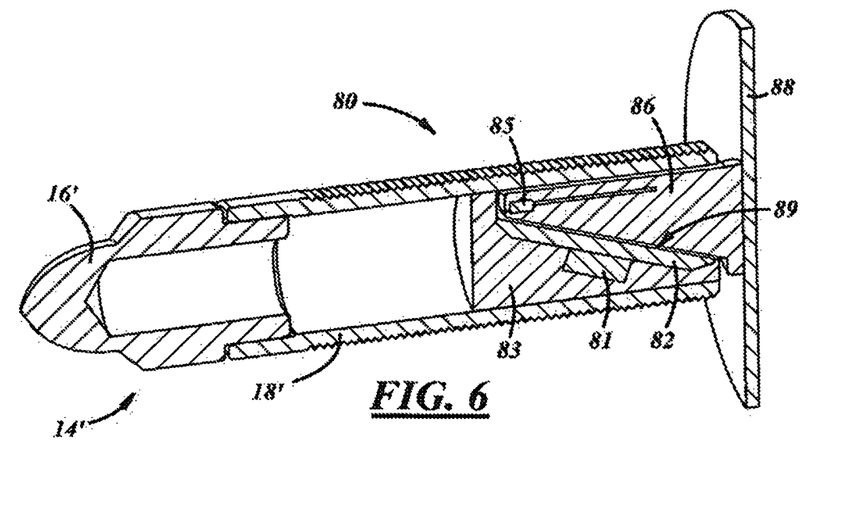
FIG. 6 depicts a positioning sensing system for use with the present invention.

In another embodiment of the invention, a sensor system can be utilized to accurately determine the position of the valve member and thus more accurately monitor the flow of coolant through the valve. One preferred sensor system 80 is shown in FIG. 6. The valve member 14' has a nose cone (head) 16' and a hollow tubular stem member 18'. A magnet 81 and flux concentrator 82 are insert molded into a sleeve member 83 which is inserted into and affixed inside the stem member 18'. A Hall Effect Device (HED) 85 is positioned in a housing member 86, such as by insert molding. The housing member 86 is secured to a PCB member 88 which is securely affixed to the valve housing 11. In use, the sleeve member 83 translates axially with the valve member 14' which allows the position of the valve member relative to the valve seat to be accurately determined and thus the valve opening accurately monitored.

As indicated in FIG. 6, the sleeve member 83 and fixed housing member 86 are mated in an angular sliding relationship along surfaces 89. This allows the HED to sense the position of valve member 14' as the valve member moves relative to the valve seat. The magnet 81 and flux concentrator 82 create a magnetic field that is sensed by the HED.

If desired, an anti-rotation mechanism can be provided to insure that the valve stem member 18 does not rotate with the roller members 32. The housing member 86 which is part of the positioning sensory mechanism 80 could be positioned in a groove member (not shown) formed inside the hollow stem 18'. Since housing member 86 is fixedly secured to the PCB control member 88, any rotation of the stem member 18' relate to the housing 11 would be prevented. Another anti-rotation mechanism can be, for example, a fixed tab member positioned in a slot. The tab member could be fixed inside the valve housing 11, while a mating the slot would be positioned longitudinally in the valve stem member 18.

The entire actuation mechanism could also be modified to operate in the coolant inside the manifold. For this purpose, the roller members and thrust bearings preferably are manufactured from a corrosion resistant material. The stepper motor stator 40 could be sealed from the coolant by a plastic overmolding process.

Figure 9:
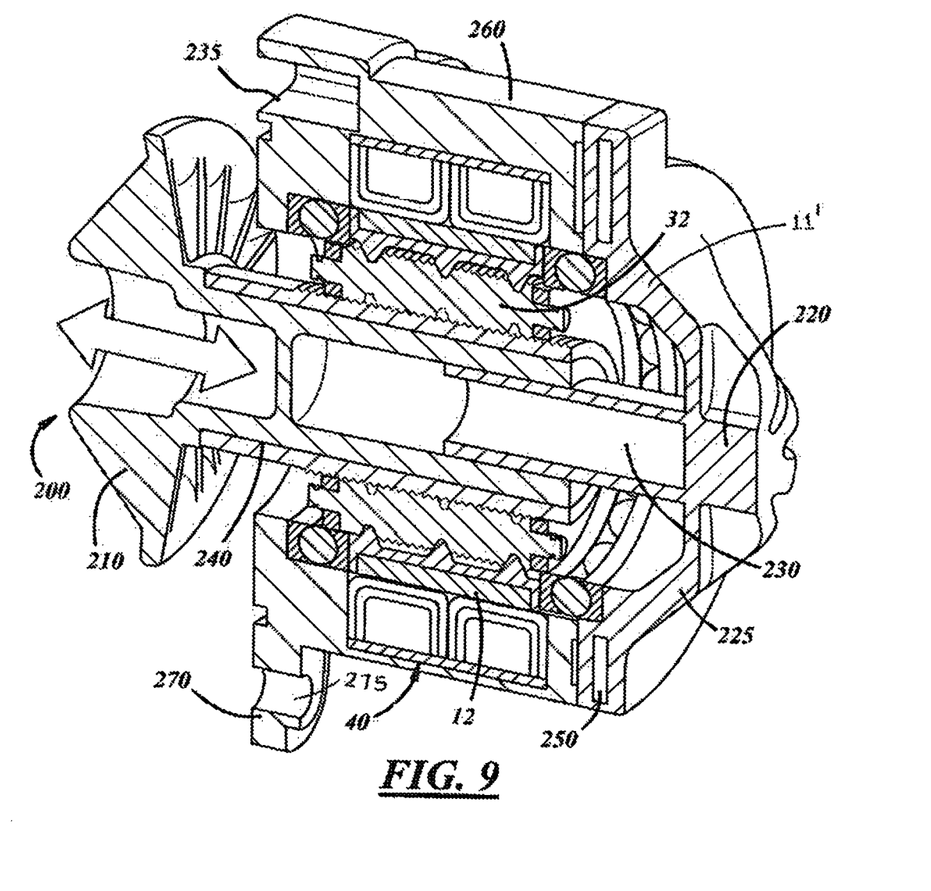
FIG. 9 illustrates an alternate embodiment of the invention.

Another embodiment 200 of the invention is shown in FIG. 9. This embodiment is substantially the same as the embodiment shown above in FIGS. 1-5, but includes a more conventional valve head member 210, a hollow stem member 220, an anti-rotation mechanism 230 and a threaded sleeve member 240 positioned around the valve stem member for interacting with the roller member 32. The control and interface PCB 250 is also shown molded into the housing 225, along with an electrical connector 235. The housing 11' also is overmolded with a plastic-type material 260 and includes a plurality of mounting members 270 and one or more mounting holes 275. Power is supplied to operate the valve mechanism 200 through the electrical connectors 235.

Figure 8:
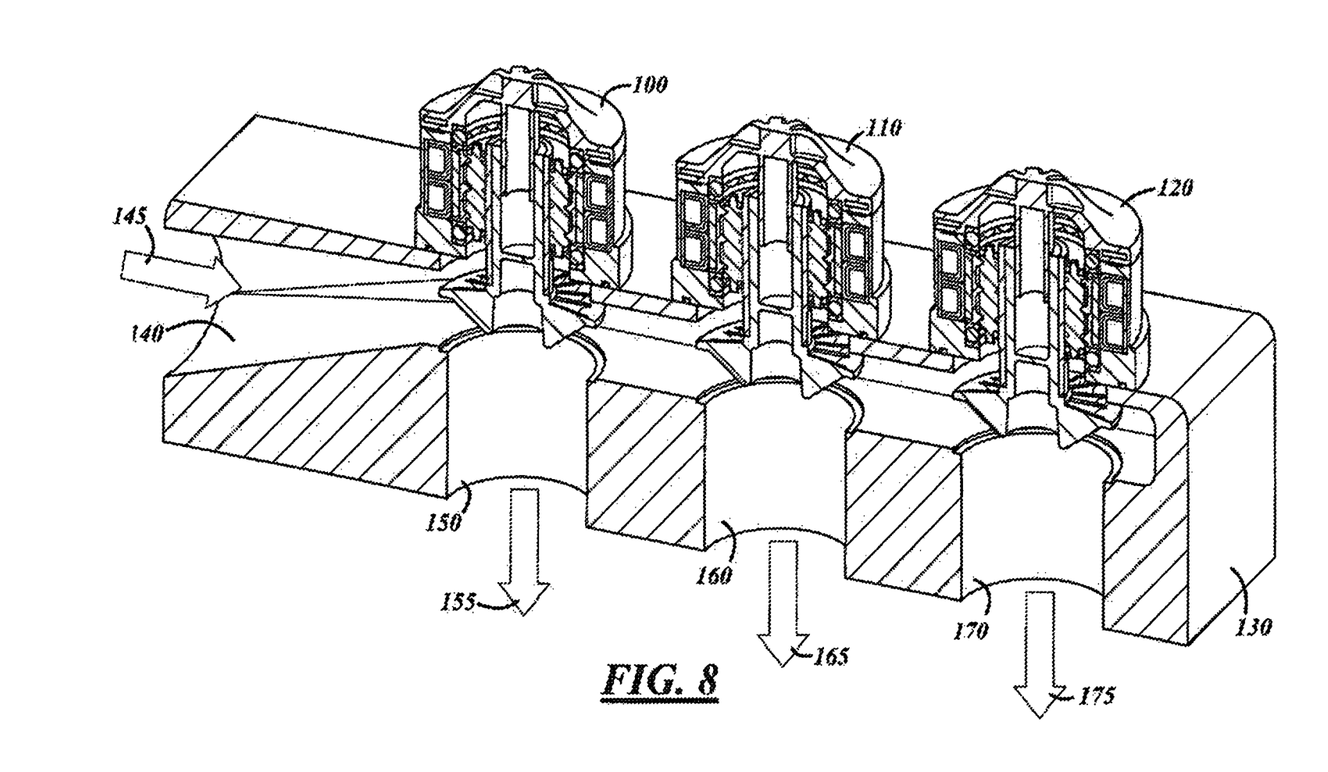
FIG. 8 is a schematic illustration of the use of a coolant valve embodiment in a manifold arrangement.

Although the inventive coolant valve described above could be used separately or individually in a radiator or other heat exchanger system, it also could be employed in a modular configuration, such as shown in FIG. 8, which would enable controlled distribution of coolant in an array of vehicle heat exchangers.

In FIG. 8, a series of coolant valve mechanisms 100, 110, 120 are positioned in a manifold 130. Each of the mechanisms 100, 110, 120 are the same as coolant valve mechanism 10 described above.

The manifold 130 has an inlet 140 where the coolant fluid enters the manifold (in the direction of arrow 145) and exits from the manifold in ports 150, 160 and 170 (in the direction of arrows 155, 165 and 175 respectively). Each of the coolant valves 100, 110 and 120 are independent and can control the flow of coolant fluid at their respective ports independently. Each of the parts 150, 160 and 170 could be in communication with a separate device or heat exchanger in the vehicle or cooling system.

The coolant valve mechanisms 10, 100, 110 and 120 are operated and controlled by an onboard electronic control system in the vehicle. Appropriate sensors (not shown) could be positioned in the coolant system at or adjacent the coolant valve in order to measure the coolant temperature and then actuate the valve mechanism(s) accordingly.

Although three coolant valves are shown in FIG. 8 in the manifold 130, it is to be understood that any number of coolant valves could be provided and utilized in a manifold or modular-type arrangement.

Although the invention has been described with respect to preferred embodiments, it is to be also understood that it is not to be so limited since changes and modifications can be made therein which are within the full scope of this invention as detailed by the following claims.

What is claimed is:
1. A valve mechanism comprises:
 (a) a manifold;
 (b) a plurality of coolant valves positioned in said manifold;
 (c) each of said coolant valves comprising:
  (i) a housing member;
  (ii) a valve member having a head member and a stem member, said stem member positioned in said housing member and having threads thereon;
  (iii) an electric motor;
  (iv) a planetary roller mechanism positioned in said housing member, said planetary roller mechanism having a roller housing member and a plurality of threaded roller members rotatably positioned in said roller housing member;

(v) wherein activation of said motor causes said rotor rotates said roller housing member and said roller members to rotate, which in turn cause said valve member to translate in an axial direction relative to said housing member.

2. The valve mechanism as described in claim 1 wherein said electric motor in each of said coolant valves comprises a brushless DC motor.

3. The valve mechanism as described in claim 1 wherein at least three roller members are provided in each of said planetary roller mechanisms.

4. The valve mechanism as described in claim 1 further comprising a rolling diaphragm seal member in each of said coolant valves.

5. The valve mechanism as described in claim 1 wherein said electric motor has a stator member and a rotor member, and said rotor member is fixedly secured to said roller housing member in each of said coolant valves.

6. The valve mechanism as described in claim 1 wherein said electric motor in each of said coolant valves is a stepper motor.

* * * * *